UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC MASSES.

1,076,216.  Specification of Letters Patent.  Patented Oct. 21, 1913.

No Drawing.  Application filed November 27, 1911. Serial No. 662,743.

*To all whom it may concern:*

Be it known that I, WILLIAM G. LINDSAY, a citizen of the United States, residing in Caldwell, county of Essex, State of New Jersey, have invented certain new and useful Improvements in Processes of Making Acetyl-Cellulose Plastic Masses, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base—acetyl cellulose.

It has long been known that camphor and ethyl alcohol in admixture form a solvent in the cold or at room temperature for nitrocellulose, and that the camphor can be mixed with the nitrocellulose and that the subsequent addition of ethyl alcohol causes solution or conversion of the nitrocellulose. I have found, however, that when that process is applied to acetyl cellulose, no solvent action takes place, and the object of my invention was to find a method of using ethyl alcohol and camphor so as to exert a solvent action upon that variety of acetyl cellulose which is soluble in acetone, and I have discovered that this can be done by the application of heat, so that while neither camphor nor ethyl alcohol by themselves or in admixture are solvents of the acetone soluble variety of acetyl cellulose in the cold, yet they become such a solvent when used in certain proportions and are heated to the proper degree. These proportions of ingredients and degrees of heat are important in practising my invention.

As one example of a process of carrying my invention into effect, I take 100 parts of the variety of acetyl cellulose specified and grind it or otherwise mix it with from, say, 25 to 40 parts of camphor so that there is a thorough mixture of the two solid ingredients. I then add from 40 to 60 parts of ethyl alcohol and stir until a substantially uniform mixture is produced. I then allow the mass to stand from 12 to 24 hours, or longer, in a closed vessel in order to secure good penetration. To this mixture heat is then applied by means of a boiling water bath or a steam bath of about 100° C. The mixture can also be manipulated by kneading or malaxating under the influence of the described temperature and then subjected to pressure in a suitable mold or form, or by other suitable means, while it is still hot. When a compact mass or cake has been thus produced it is cooled while still under pressure, and in this way a solid mass is produced which is suitable for cutting into sheets or other forms, or the mold may be of such form that the finally desired shape may be given to the object by this one operation. The sheets or other objects produced by this method are then subjected to the drying or seasoning process which is common to the art.

A more or less filterable solution may be produced by increasing the ethyl alcohol to, say 80 parts, applying heat, and filtering under pressure while still hot, and it is best to reduce the amount of alcohol in the mixture by evaporation to, say, 50 parts, before allowing the mass to solidify. Of course, if desired, the ethyl alcohol can be incorporated with the acetyl cellulose first without departing from the spirit of my invention because it exerts no solvent action by itself upon the cellulose, and the camphor can be added subsequently; or, again, the camphor and alcohol can be mixed together and poured upon the cellulose, for they will exert no solvent action upon the cellulose in the cold, but I prefer to mix the camphor and acetyl cellulose together before adding the ethyl alcohol.

It will be readily understood that slight variations in the proportions of the camphor and ethyl alcohol used may be employed, but I prefer to use the proportions specified. It will also be readily understood by those skilled in the art that the various coloring matters and pigments and inert substances, such as are used in the nitrocellulose art, may be employed without departing from the spirit of my invention.

Having thus described my invention, what I claim is:—

1. The process of making acetyl cellulose plastic masses which comprises incorporating an acetone-soluble acetyl cellulose with camphor in the presence of a small proportion of ethyl alcohol, and heating.

2. The process of making acetyl cellulose plastic masses which comprises incorporating an acetone-soluble acetyl cellulose with camphor in the presence of a small proportion of ethyl alcohol, and heating, the proportion of alcohol being about one to one and one-half times the amount of the camphor.

3. The process of making acetyl cellulose plastic masses which comprises incorporating an acetone-soluble acetyl cellulose with camphor in the presence of a small proportion of ethyl alcohol, and heating, the proportion of alcohol being about one to one and one-half times the amount of the camphor, and being about one-half the amount of the acetyl cellulose.

WILLIAM G. LINDSAY.

Witnesses:
J. E. HINDON HYDE,
MABEL DENTON.